INVENTOR
Michisuke Nagasaki

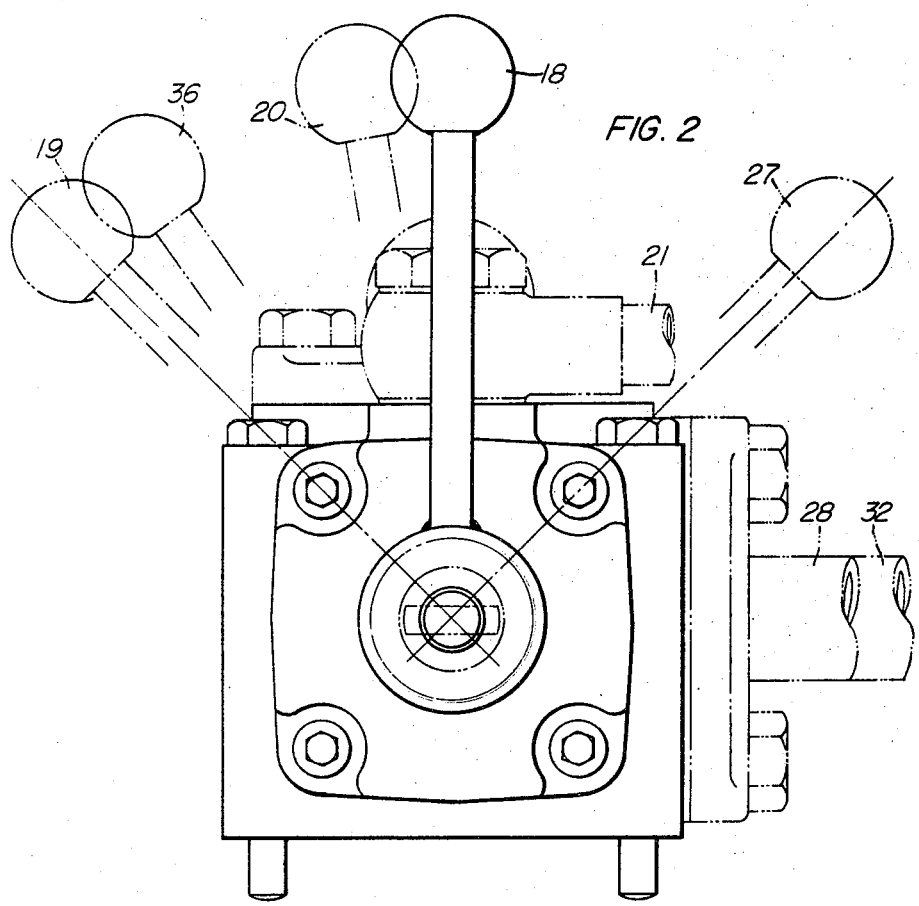

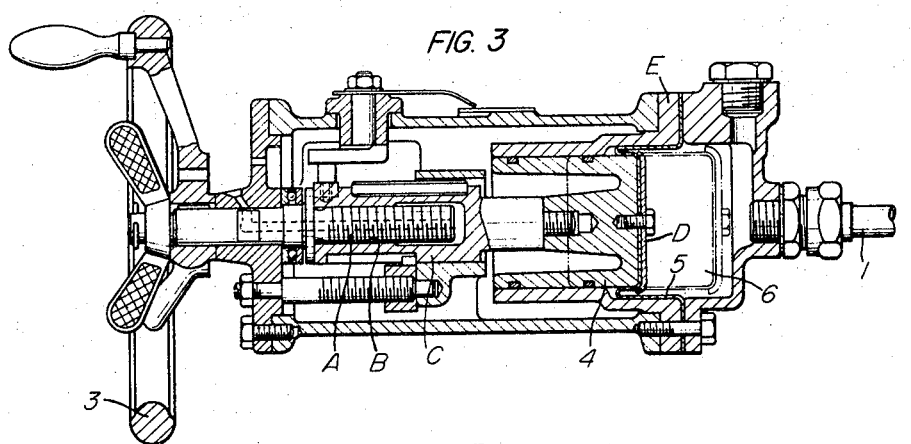
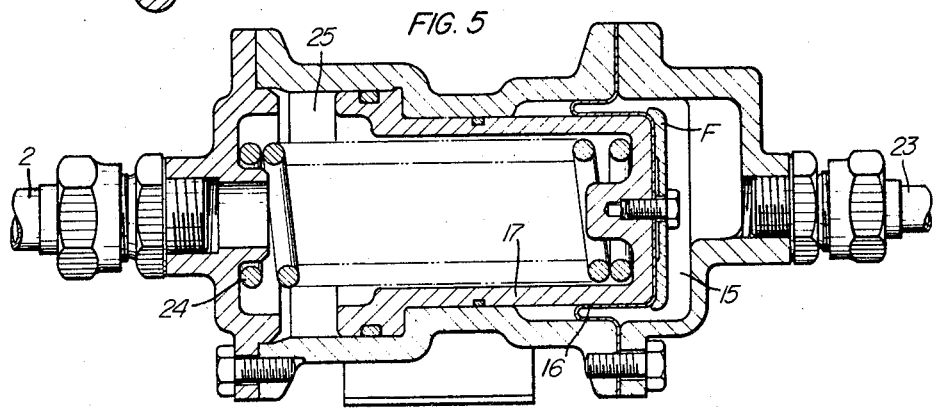

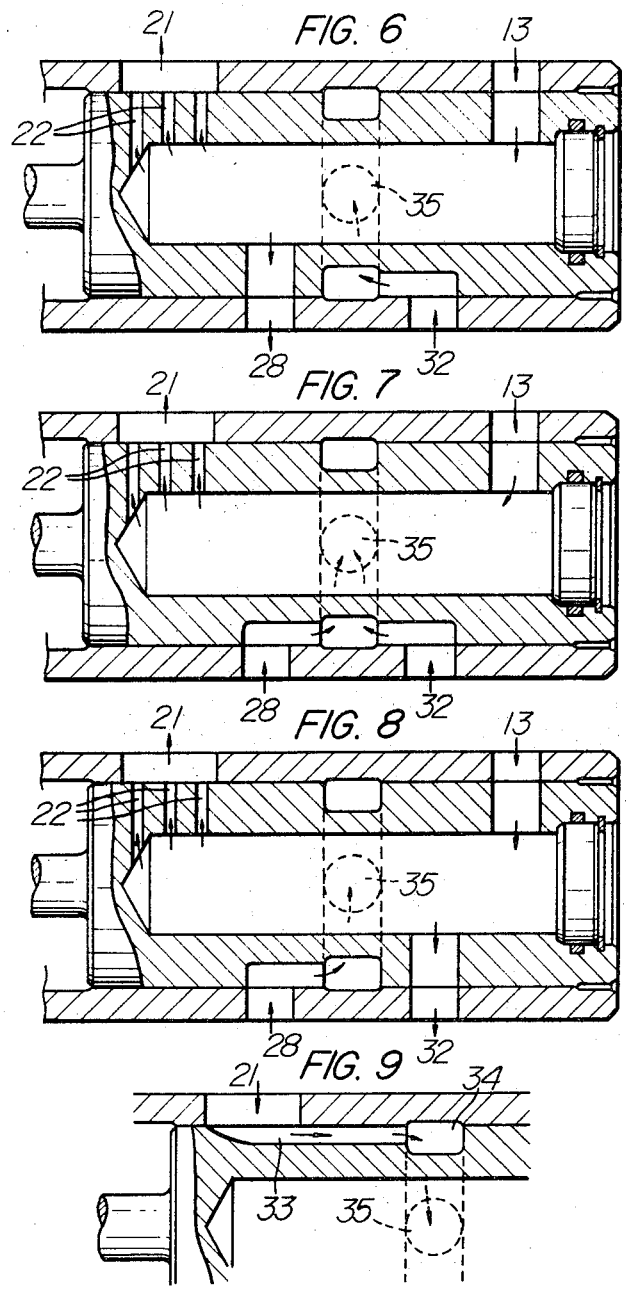

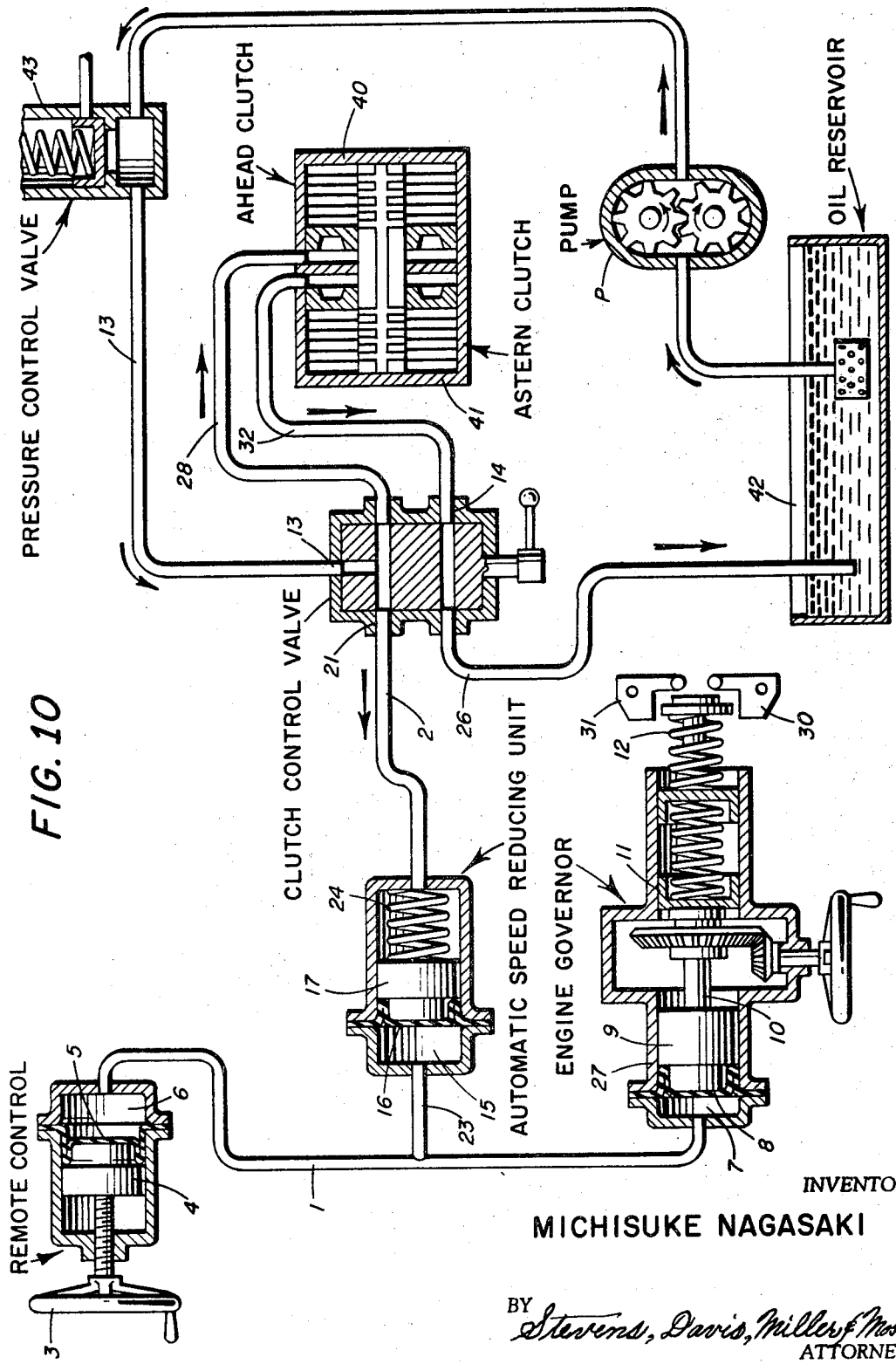

United States Patent Office

3,401,776
Patented Sept. 17, 1968

3,401,776
TRANSMISSION CLUTCH AND THROTTLE CONTROL
Michisuke Nagasaki, Toyonaka-shi, Japan, assignor to Tadao Yamaoka, Ashiya-shi, Japan, a national of Japan
Filed Dec. 9, 1965, Ser. No. 512,704
5 Claims. (Cl. 192—.084)

ABSTRACT OF THE DISCLOSURE

An automatic engine-speed control device, operable by a handle of a clutch control valve of a hydraulic reversing gear, for changing the direction of rotation of a propeller shaft to be driven by a marine propulsion engine. The device comprises hydraulic means operable to act upon a governor spring to thereby regulate the speed of the marine engine, the means being connected with an operating cylinder of the governor spring and the clutch control valve and operable upon positioning the control handle of the reversing gear for forward or reverse rotation of the propeller shaft to automatically reduce the engine speed and subsequently to restore the normal engine speed.

---

This invention relates to speed control of marine propulsion engines associated with the operation of the reversing gear therefor and is intended to provide an automatic engine-speed control device operable with the control handle of an oil-hydraulic gear for a marine propulsion engine.

With marine propulsion engines, when it is desired to engage the clutch of the reversing gear, it is generally necessary to reduce the engine speed momentarily before the control handle of the reversing gear is placed in its ahead or astern position and, after the handle is positioned securely in place, to operate the handle of the engine governor to raise the engine speed to the desired r.p.m., since otherwise the reversing gear may be subjected to an extraordinary load which causes damage to the gear. In practice, however, the governor handle is usually not operated for operation of the handle of the reversing gear.

According to the present invention, arrangement is made so that, when the handle of the clutch control valve of an oil-hydraulic reversing gear is shifted from its neutral position to its ahead or astern position, the governor spring is automatically acted upon by hydraulic means to reduce momentarily the r.p.m. of the engine and subsequently, when the handle has been set, automatically restore the engine speed to the previous r.p.m.

Figure 1:
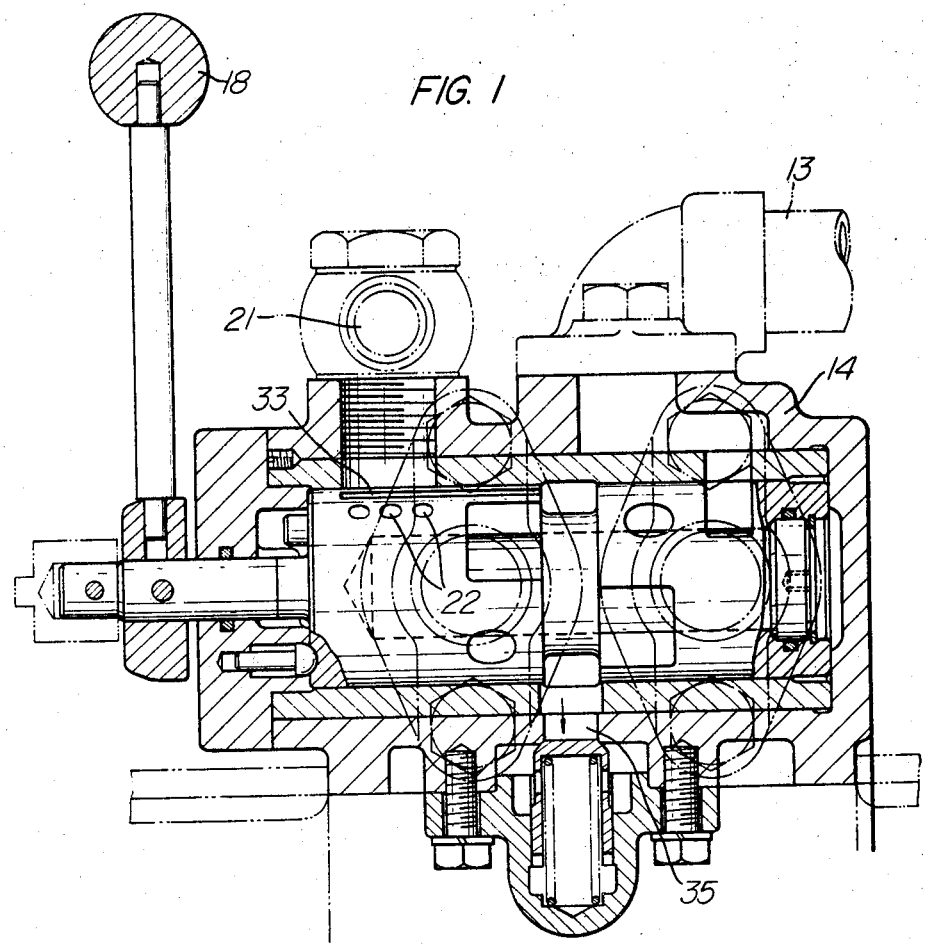
Figure 4:
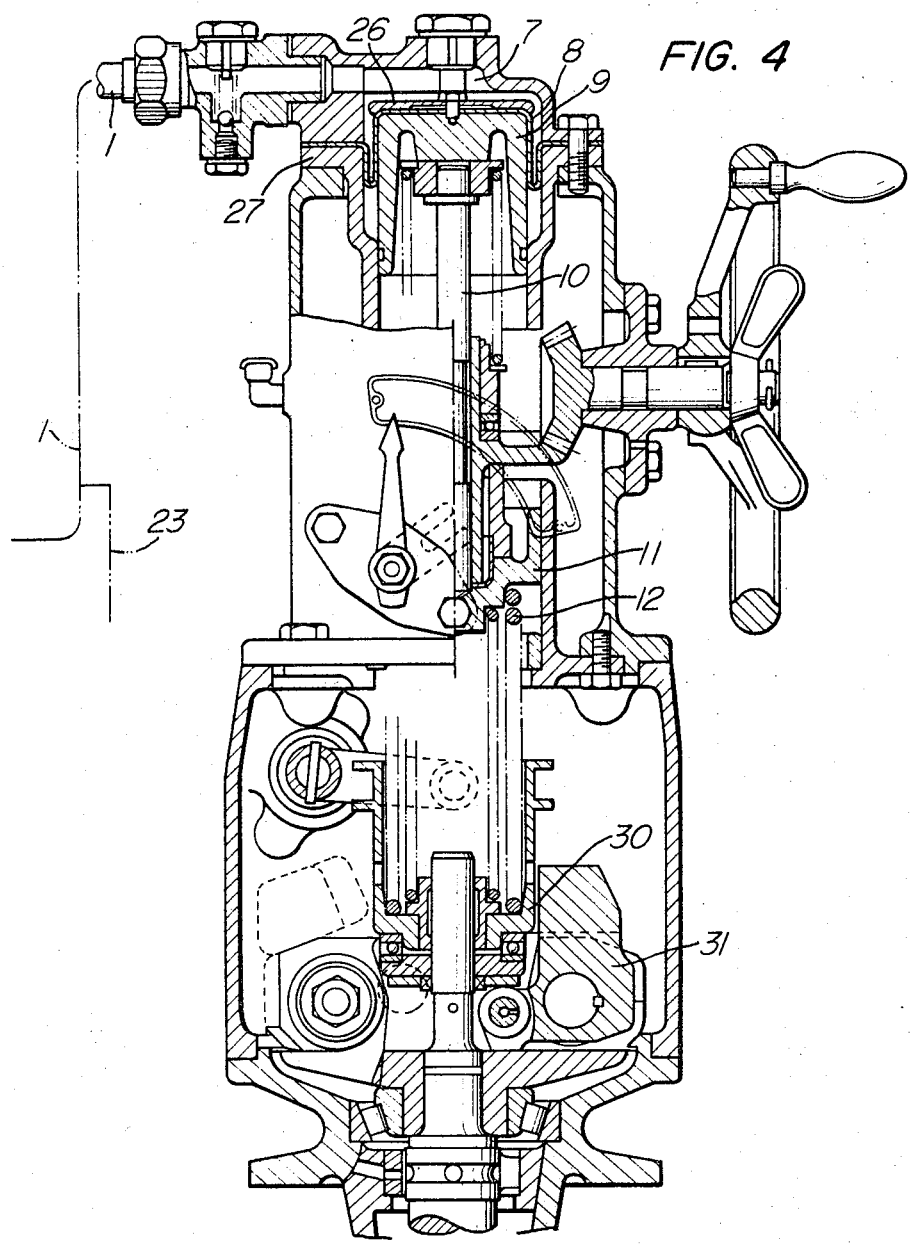

The above and other objects, features and advantages of the present invention will become apparent from the following description when taken in conjunction with the accompanying drawings, which illustrate one practical embodiment of the invention and in which:

FIG. 1 is a longitudinal cross-sectional view of the handle portion of the reversing gear in the embodiment;
FIG. 2 is a side view of same;
FIG. 3 is a longitudinal cross-sectional view of the handle portion of the governor remote control;
FIG. 4 is a view similar to FIG. 3, illustrating the governor section;
FIG. 5 is a view similar to FIGS. 3 and 4, illustrating the oil-hydraulic operating cylinder assembly;
FIGS. 6 to 8 are cross-sectional views illustrating the different operation stages of the clutch control valve;
FIG. 9 is a fragmentary cross-sectional view illustrating the clutch control valve in one of its operative positions; and FIG. 10 is a schematic diagram of the entire system with the components being shown in section.

Referring first to FIG. 3, the governor control handle 3 of the engine is secured to a shaft A which has an externally threaded portion B, which in turn is threadably engaged with a sleeve C integral with a piston 4. Secured to the piston 4 by retainer means D is a bellows or diaphragm 5 which is clamped at the periphery to a cylindrical member E forming part of a casing of the governor remote control.

As illustrated, the piston 4 is slidably received in the cylindrical member E and the space therein on one side of the piston 4 communicates with a conduit 1 which is secured at one end to the casing and at the other end to another cylinder 7 (FIG. 4) forming part of the governor assembly with another conduit 23 branching from the conduit 1. Accommodated in the cylinder 7 is a piston 9 to which a diaphragm 8 is secured at its central portion by retainer means 26, the periphery of the diaphragm 8 being secured a cylinder member 27 clamped to the casing of the governor assembly. A piston rod 10 integral with the piston 9 is in operative engagement with an actuator disc 11 associated with one end of a coiled spring 12, the other end of which is seated in a disc 30, which acts upon governor weights 31.

Referring to FIG. 1, a conduit 13 is connected to a hydraulic pump forming part of the oil-hydraulic reversing gear and also connected to the clutch control valve assembly, as illustrated in FIG. 10, so that the oil pressure is at all times fed through the conduit 13 to the interior of the casing 14 of the assembly.

The conduit 23 referred to above is connected at the other end with an oil-hydraulic cylinder 15 of a speed reducing unit shown in FIG. 5. Accommodated in the cylinder 15 is a piston 17 to which a diaphragm 16 is secured at its center by retainer means F, the periphery of the diaphragm 16 being secured to the cylinder 15, as illustrated.

A conduit 2 is in communication with the cylinder space 25 on that side of the piston 17 remote from the diaphragm 16 with a coiled spring 24 arranged in the space 25.

Referring to FIGS. 1 and 2, reference numeral 18 indicates the control handle of the reversing gear and 21 indicates a conduit leading to the speed reducing unit and normally communicationg with the conduit 2. Reference numeral 22 indicates openings formed in the cylindrical valve of the clutch control valve assembly (FIG. 1). Reference numerals 19 and 27 in FIG. 2 indicate the ahead and astern positions, respectively, of the control handle 18; 28 indicates an oil conduit leading to an ahead side oil-hydraulic clutch shown in FIG. 10; and 32 an oil conduit leading to an astern side oil-hydraulic clutch.

FIGS. 6, 7 and 8 illustrate the ahead, neutral and astern position of the control valve, respectively.

In operation, as the handle 3 is turned counterclockwise, looking to the right in FIG. 3, the piston 4 is advanced to the right together with the diaphragm 5 so that the oil in the cylinder 6 is forced through the conduit 1 into the space 7 (FIG. 4) to push the piston 9 downwardly through the intermediary of the diaphragm 8 associated therewith. In this manner, the coiled spring 12 is compressed by the actuator disc 11 descending together with the piston rod 10. As the result, the governor weights 31 are actuated into a position to rotate the engine at a certain r.p.m. On this occasion, it is to be noted that the oil pressure produced by the oil pump of the oil-hydraulic reversing gear, which pump is directly connected with the engine, is directed through the conduit 13 (FIG. 1) and the clutch control valve casing 14 into the chamber 25, in the oil-hydraulic cylinder shown in FIG. 5, biasing the piston 17 therein rightward. At this time, if the clutch control handle 18 of the reversing gear is shifted from its neutral or vertical position to its ahead position 19, part of the oil pressure act upon the ahead disk plate of the reversing gear to engage the ahead side clutch. Prior to this, however, when the clutch control handle 18 is moved past the position indicated at 20 in FIG. 2, the conduit 21 is disconnected from the conduit 13 by closing the openings 22, and the oil in the chamber 25 of the speed reducing unit is allowed to escape to the exterior of the clutch control valve case 14 as shown in FIG. 9, through conduits 2, 21, an axial slit 33 formed in the outer surface of the cylindrical valve of the clutch control valve, an annular recess 34 of the same and an outlet 35 of the assembly casing 14. As the result, the piston 17 (FIG. 5) is displaced to the left under the pressure prevailing in the cylinder space 15. In other words, the oil pressure in the cylinder 7 (FIG. 4), previously acting upon the governor is led into the cylinder space 15 with the result that the piston 9 (FIG. 4) is raised under the action of coiled spring 12 together with the rod 10 and actuator disc 11.

This rise of piston 9 naturally reduces the force acting upon the governor weights 31 to decrease the r.p.m. of the engine.

Next, when the control handle 18 is shifted to its position 36, the openings 22 in the cylinder wall of the clutch control valve shown in FIG. 1 are brought into alignment with the adjacent opening of the conduit 21, as the result, the openings 22 direct the oil pressure into chamber 25 (FIG. 5) to displace the piston 17 rightward thus to force the oil in the space 15 into the cylinder 7 (FIG. 4). As the result, the piston 9 in the cylinder 7 is lowered through the intermediary of the diaphragm 8 so that the engine is restored to its normal r.p.m.

The operation of the inventive automatic engine-speed control device operable with a handle of a clutch control valve of a hydraulic reversing gear for changing the direction of rotation of a propeller shaft driven by a marine propulsion engine will become clear from the following discussion relative to FIG. 10. The clutch control valve having the control handle 18 is connected with one side of an automatic speed reducing unit, the other side of which is connected with an operating cylinder of an engine governor and a governor remote control. When the handle 18 is moved from a neutral position to either an ahead or astern position, fluid under pressure flows from pump P to enter the control valve through conduit 13 and is directed to either the ahead or astern side of the reversing gear respectively through conduits 28 or 32 so as to actuate one of the clutches 40 and 41. During the initial handle movement to either the astern or ahead position, the pressurized oil flowing from the pump is directed into a chamber 25 in the automatic speed reducing unit through conduit 13, openings 22 in the cylinder wall of the clutch control valve, conduit 21 and conduit 2, when the handle is in its neutral position. As the handle is moved, this flow is interrupted by the closing of the openings 22, and the oil in the chamber 25 is allowed to escape from the clutch control valve, as shown in FIG. 9. As the result, the oil pressure in the operating cylinder 7 of the engine governor, which is in communication with the chamber 15 of the automatic speed reducing unit, is reduced thus causing the spring force acting upon the governor weights 31 to decrease to thereby reduce the rotational speed of the engine. When the control handle is shifted further towards the ahead or astern position, the openings 22 are again brought into alignment with the opening of the conduit 21 and as a result, the pressure of the operating cylinder 7 of the engine governor is restored causing the engine to rotate at the same speed as the speed when the control handle was in its neutral position.

To summarize the present invention, when the control handle of the reversing gear is set in its ahead or astern position, the governor spring is automatically acted upon by hydraulic means prior to the engagement of the clutch to momentarily reduce the engine speed so that the reversing gear is kept from any excessive loading which may cause trouble thereto. Moreover, at the instant when the clutch control handle has been completely set in its intended position, the engine speed is automatically restored to its previous r.p.m. by hydraulic means.

Thought one practical embodiment of the present invention has been described and shown herein, it is to be understood that it is not to be restricted to the details set forth but many changes and modifications may be made without departing from the spirit and scope of the invention as defined in the annexed claims.

What I claim is:

1. An automatic engine-speed control device for marine propulsion systems having at least one engine means operatively connected to at least one propeller shaft means through at least one clutch means, said device comprising clutch control valve means operatively connected to control said clutch means, engine governor means operatively connected to control the speed of said engine means, remote control means operatively connected to initially control said engine governor, speed reducing means operatively connected between said clutch control valve and said governor and being responsive to the former to control the latter, and a source of pressurized hydraulic fluid comprising a hydraulic fluid reservoir and pump means having an inlet connected to said reservoir and an outlet connected to said device, whereby upon selective shifting between forward and reverse rotation of said propeller shaft means, engine speed is automatically reduced from a set operating speed and subsequently restored to said operating speed, said clutch control valve comprises a casing having a chamber therein, a valve member movably mounted in said casing, means to control the positioning of said valve, a first conduit connected to said source of pressurized hydraulic fluid, a second conduit connected to said speed reducing means, third and fourth conduit means connected to said clutch means for controlling ahead and astern operation respectively, and fifth conduit means connected to return hydraulic fluid to said fluid source.

2. An automatic engine speed control device according to claim 1 in which said valve member comprises a central bore, orifice means providing continuous communication between said first conduit and said bore, a plurality of radial orifices disposed about said member for selectively placing said bore in communication with said second conduit, an external annular groove substantially centrally located between said third and fourth conduits and in constant communication with said fifth conduit and at least four axial grooves in said member for selectively placing said first to fourth conduits into communication with said annular groove.

3. An automatic engine speed control device according to claim 1 in which said engine governor means comprises a casing having a chamber formed therein, piston means slidably mounted in said chamber, conduit means connected between said chamber and said speed reducing means, governor weights mounted in said casing and means operatively connected to said piston for controlling the positioning of said weights whereby said engine speed is controlled.

4. An automatic engine-speed control device according to claim 1 in which said speed reducing means comprises a casing having a chamber formed therein, a piston slidably mounted in said casing, first and second conduit means connected to said chamber on opposite sides of said piston, said first conduit being connected to said clutch control valve and said second conduit being connected to said engine governor means.

5. An automatic engine-speed control device according to claim 1 in which said remote control means comprises a casing having a chamber therein, a piston slidably mounted in said chamber, conduit means connected between said chamber and said engine governor, and means for selectively positioning said piston in said chamber.

References Cited

UNITED STATES PATENTS

| | | | |
|---|---|---|---|
| 2,326,911 | 8/1943 | Aikman | 192—.098 |
| 2,386,391 | 10/1945 | Fike et al. | 192—.098 |
| 2,580,367 | 12/1951 | Stevens | 192—.098 |
| 2,434,489 | 1/1948 | Dugas | 192—.084 |
| 2,812,043 | 11/1957 | Wilson | 192—.084 |
| 2,925,156 | 2/1960 | Grant et al. | 192—.084 X |
| 3,202,011 | 8/1965 | Kobelt | 74—472.1 |
| 3,269,206 | 11/1966 | Carr | 192—.084 |

BENJAMIN W. WYCHE III, *Primary Examiner.*